July 2, 1940. W. KING 2,206,405
DEVICE FOR USE IN MAKING PIPE JOINTS
Filed May 1, 1939
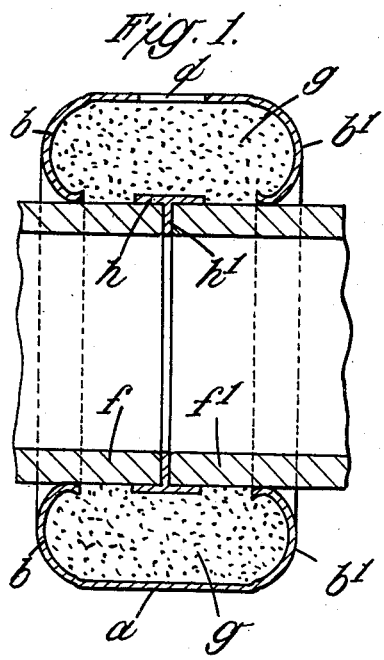
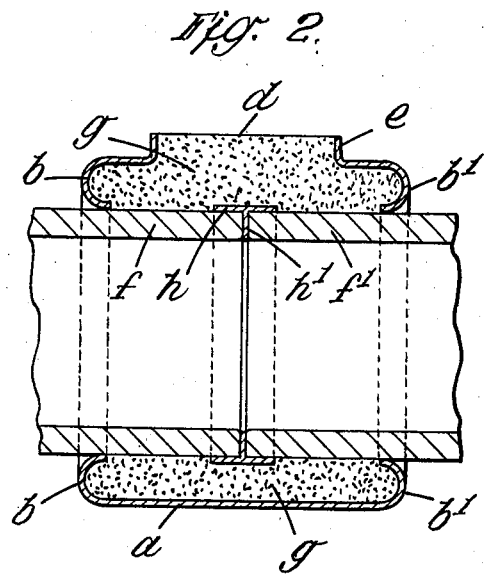
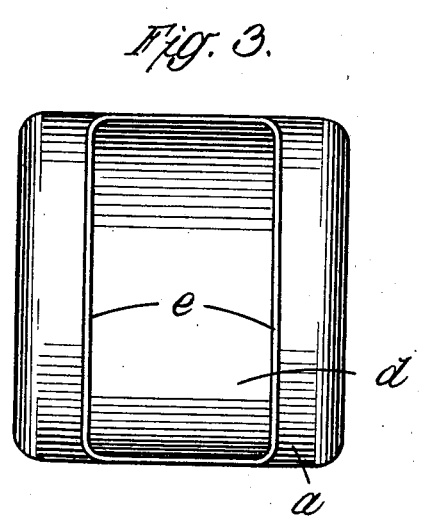
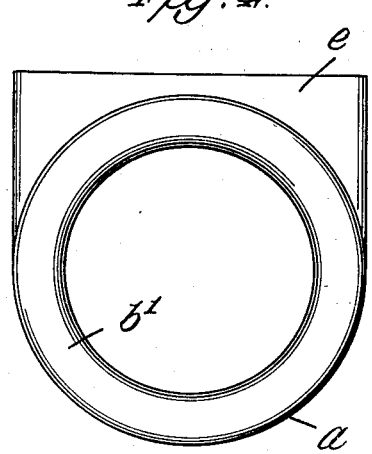
Inventor
William King, Deceased,
By Ian Waveney Girvan, Executor
By *[signature]*
his ATTY.

Patented July 2, 1940

2,206,405

UNITED STATES PATENT OFFICE 2,206,405

DEVICE FOR USE IN MAKING PIPE JOINTS

William King, deceased, late of Eastcote, Ruislip, England, by Ian Waveney Girvan, executor, Denham Village, England, assignor to The Pipe-Joint Manufacturing Company Limited, London, England, a British company Application May 1, 1939, Serial No. 271,131
In Great Britain December 30, 1938

3 Claims. (Cl. 285—114)

This invention relates to improvements in devices for use in making pipe joints, and has for its chief object to provide a novel device by means of which the ends of adjacent plain or butt ended pipes may be satisfactorily and quickly secured.

The device, according to the invention, comprises a tubular member made of paper, papier-mâché or similar substance, the ends of which curl downwardly and inwardly to grip the pipe ends, an aperture being provided for the introduction of cementitious or bituminous bonding material.

According to a preferred form of the invention, the aperture for the introduction of the bonding material is in length equal or approximately equal to the diameter of the member and in width is approximately half the length thereof, the aperture being bounded by an upwardly extending extension of the member.

In order that the invention may be clearly understood and readily carried into effect, the same is hereinafter more fully described with reference to the accompanying drawing which is given by way of example only.

In the drawing:

Figure 1 is a section through one form of the device shown in position on the ends of adjoining pipes, Figure 2 is similar to Figure 1 but showing another form of the device, Figure 3 is a plan view of the device according to Figure 2, and Figure 4 is an end elevation thereof.

Referring now to the said drawing in which like parts bear like reference letters, and in particular to Figure 1 thereof, the device comprises a shroud $a$ of tubular form having its ends $b$, $b^1$ curved and turned inwardly, desirably terminating in increasedly curled ends $c$. An aperture $d$ for the introduction of cementitious or bituminous bonding material is provided.

In the embodiment illustrated in Figures 2 to 4, the aperture $d$ in length equals or is approximately equal to the diameter of the tube $a$ and in width extends approximately over half the length of the device as may be seen from Figure 3, and is bounded by an upwardly extending extension $e$ of the body $a$ of the device.

The joint is made by introducing the ends of the pipes $f$, $f^1$ to be joined, one into each end of the tubular member $a$, so that its ends $b$, $b^1$ grip the pipes and maintain them at even distance from the wall of the member $a$. Bonding material, such as cement, bitumen, or bituminous compound is flowed into the member through the aperture $d$ therein, which is situated at the highest point, to entirely fill the member as indicated by $g$.

Naturally, the tubular member $a$ will be suitably dimensioned to adapt to the diameter of the pipes $f$, $f^1$ with which it is intended to be used and the material comprising the same will have a sufficient degree of rigidity yet be flexible enough for the curled ends $b$, $b^1$ to give to a slight extent to ensure a good grip on the pipes.

In order to prevent the bonding material penetrating the bore of the pipes, the ends of the adjacent pipes are sealed as by covering the junction with a strip of adhesive material or with a tubular washer but preferably by means of a washer $h$ of T section, the shank $h^1$ of which is positioned between the ends of the pipes $f$, $f^1$ so that the same may be pushed hard up against it. The shank is, therefore, desirably of a length substantially equal to the thickness of the pipes with which it is intended to be used.

In its simplest form illustrated in Figure 1, some little difficulty may be encountered in positioning the tubular member as, in order to seal the ends of the pipes, it is necessary to slide the member $a$ entirely onto the one pipe, to seal the ends of the pipes and then slide it over the joint to position it equally on the two pipes. This disadvantage is entirely eliminated in the preferred form of the invention illustrated in Figures 2 to 4 as the tubular or T-shaped washer $h$ may be introduced through the wide mouth aperture $d$ prior to pushing the ends of the pipes together. A further advantage of the preferred form of the invention is that, with the larger aperture $d$, even the most clumsy workman may easily introduce the bonding material into the tubular member.

The tubular member $a$ positions the pipe ends concentrically and it provides a uniform chamber for the reception of the bonding material which is thus held distributed around the pipe ends until it sets. The operation of joining the pipes is completed quickly and a satisfactory and permanent joint results.

It is claimed:

1. A device for use in joining pipes comprising a tubular member of pliable material having its ends curled inwardly to contact with their outer surfaces the circumferential surfaces of the pipe ends to be joined and to space the center portion of said member away from the pipes, an aperture being provided in said member for the introduction of bonding material.

2. A device as in claim 1 in which the aperture for the introduction of the bonding material is in length approximately equal to the diameter of the member.

3. A device as in claim 1 made of papier-mâché.

IAN WAVENEY GIRVAN,
Executor of the Estate of William King, Deceased.